(12) United States Patent
Wang et al.

(10) Patent No.: US 9,363,326 B2
(45) Date of Patent: Jun. 7, 2016

(54) WEB TRACKING PROTECTION

(75) Inventors: Xiaodong Wang, Shanxi (CN); Jun Fang, Shanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 355 days.

(21) Appl. No.: 13/977,918

(22) PCT Filed: Feb. 6, 2012

(86) PCT No.: PCT/CN2012/070893
§ 371 (c)(1),
(2), (4) Date: Jul. 1, 2013

(87) PCT Pub. No.: WO2013/116974
PCT Pub. Date: Aug. 15, 2013

(65) Prior Publication Data
US 2015/0189027 A1  Jul. 2, 2015

(51) Int. Cl.
*H04L 29/08* (2006.01)
*G06F 17/30* (2006.01)

(52) U.S. Cl.
CPC .......... *H04L 67/22* (2013.01); *G06F 17/30867* (2013.01); *G06F 17/30902* (2013.01); *H04L 67/02* (2013.01); *H04L 67/32* (2013.01)

(58) Field of Classification Search
CPC ......... H04L 67/02; H04L 67/22; H04L 67/32; G06F 17/30867; G06F 17/30902
See application file for complete search history.

(56) References Cited

U.S. PATENT DOCUMENTS

| | | | |
|---|---|---|---|
| 6,560,588 B1 * | 5/2003 | Minter | G06F 17/30867 706/50 |
| 7,107,269 B2 | 9/2006 | Arlein et al. | |
| 7,734,632 B2 * | 6/2010 | Wang | G06Q 30/02 707/749 |
| 8,533,013 B2 * | 9/2013 | Cole | G06F 17/30867 705/14.19 |
| 2004/0078475 A1 | 4/2004 | Camenisch et al. | |
| 2012/0259831 A1 * | 10/2012 | Wang | G06F 17/30867 707/708 |

FOREIGN PATENT DOCUMENTS

| | | |
|---|---|---|
| CN | 1983264 A | 6/2007 |
| CN | 101197727 A | 6/2008 |
| CN | 101694659 A | 4/2010 |
| JP | 2004503875 A | 2/2004 |
| JP | 2004514988 A | 5/2004 |
| JP | 2011108195 A | 6/2011 |
| JP | 2011191846 A | 9/2011 |

OTHER PUBLICATIONS

MSDN Blog, IE9 and Privacy: Introducing Tracking Protection, published Dec. 7, 2010, accessed online on Nov. 27, 2012 via http://blogs.msdn.com/b/ie/archive/2010/12/07/ie9-and-privacy-introducing-tracking-protection-v8.aspx, 2010.11.
Google releases "Do not track" add-on for Chrome, Webuser, Online Forum, Jan. 24, 2011, accessed online on Dec. 4, 2012 via http://www.webuser.co.uk/forums/showthread.php?t=91127.

(Continued)

*Primary Examiner* — Patrice Winder
(74) *Attorney, Agent, or Firm* — Brundidge & Stanger, P.C.

(57) ABSTRACT

Technologies and implementations for providing web tracking protection are generally disclosed.

21 Claims, 4 Drawing Sheets

(56) References Cited

OTHER PUBLICATIONS

Budanitsky, A., et al., Semantic distance in WordNet: An experimental, application oriented evaluation of five measures. In Workshop on WordNet and Other Lexical Resources, Second meeting of the North American Chapter of the Association for Computational Linguistics, Pittsburgh, PA, 2001.

Greenspun, P., Philip and Alex's Guide to Web Publishing, Chapter 9: User Tracking, accessed online on Dec. 10, 2012 via http://philip.greenspun.com/panda/user-tracking, Morgan Kaufmann, Apr. 1999.

Schieltz, M., eHow Contributor, How to monitor user internet usage, Aug. 23, 2010, accessed online on Nov. 27, 2012 via http://www.ehow.com/how_6854367_monitor-user-internet-usage.html.

Tor Project: Overview, pp. 1-3, accessed online on Apr. 18, 2011 via torproject.org.in/about/overview.html.en.

The State Intellectual Property Office, The PR China, International Search Report and Written Opinion of the International searching authority for PCT/CN2012/070893 mailed on Nov. 15, 2012, China.

\* cited by examiner

300 A computer program product

302 A signal bearing medium

304 Machine-readable instructions that, when executed, cause a device to provide web tracking protection by:

determining one or more web sites of interest to a user of the device;

determining one or more terms of interest to the user based at least in part on the one or more web sites of interest;

receiving an indication of visiting a web site having a user tracking function;

determining a non-interest portion of content of the web site having the user tracking function, the non-interest portion of the content being unrelated to the one or more terms of interest;

transmitting one or more web requests to the web site having the user tracking function, the one or more web requests being related to the non-interest portion of the content of the web site;

responsive to the one or more web requests, receiving information from the web site having the user tracking function;

deleting at least a portion of the information received from the web site having the user tracking function;

determining the web site having the user tracking function has the user tracking function by comparing an identifier of the web site to a list of identifiers of web sites known to have user tracking functions;

receiving the list of identifiers of web sites known to have user tracking functions;

determining the web site having the user tracking function has the user tracking function by evaluating cookie activity related to the web site;

receiving the directory tree representing the web site directory of the web site having the user tracking function; or determining the directory tree representing the web site directory of the web site having the user tracking function.

| 306 a computer-readable medium | 308 a recordable medium | 310 a communications medium |

Fig. 3

WEB TRACKING PROTECTION

CROSS-REFERENCE TO RELATED APPLICATION

This application is the National Stage filing under 35 U.S.C. §371 of PCT Application No. PCT/CN2012/070893 filed on Feb. 6, 2012.

BACKGROUND

Unless otherwise indicated herein, the approaches described in this section are not prior art to the claims in this application and are not admitted to be prior art by inclusion in this section.

Current web tracking protection techniques may include providing tracking protection lists having web sites that the device browser may visit or call only if the user visits them directly (e.g., by clicking a link or typing the web address). Such techniques may limit the information collected at certain aggregating web sites and/or the information available to the user such that the user experience of web browsing may be diminished.

SUMMARY

In various embodiments, the present disclosure describes examples methods for providing web tracking protection at a device. Example methods may include determining web sites of interest to a user of the device, determining terms of interest to the user based on the web sites of interest, receiving an indication of visiting a web site having a user tracking function, determining a non-interest portion of content of the web site, the non-interest portion of the content being unrelated to the terms of interest, transmitting web requests related to the non-interest portion of the content to the web site, receiving information from the web site responsive to the web requests, and deleting at least a portion of the information received from the web site having the user tracking function.

In various embodiments, the present disclosure also describes example machine readable non-transitory medium having stored therein instructions that, when executed, cause a device to provide web tracking protection. Example machine readable non-transitory media may have stored therein instructions that, when executed, cause the device to provide web tracking protection by determining web sites of interest to a user of the device, determining terms of interest to the user based on the web sites of interest, receiving an indication of visiting a web site having a user tracking function, determining a non-interest portion of content of the web site, the non-interest portion of the content being unrelated to the terms of interest, transmitting web requests related to the non-interest portion of the content to the web site, receiving information from the web site responsive to the web requests, and deleting at least a portion of the information received from the web site having the user tracking function.

In various embodiments, the present disclosure also describes example devices. Example devices may include a processor and a machine readable medium having stored therein instructions that, when executed, cause the device to provide web tracking protection by determining web sites of interest to a user of the device, determining terms of interest to the user based on the web sites of interest, receiving an indication of visiting a web site having a user tracking function, determining a non-interest portion of content of the web site, the non-interest portion of the content being unrelated to the terms of interest, transmitting web requests related to the non-interest portion of the content to the web site, receiving information from the web site responsive to the web requests, and deleting at least a portion of the information received from the web site having the user tracking function.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 3 is an illustration of an example computer program product; and

DETAILED DESCRIPTION

Figure 1:
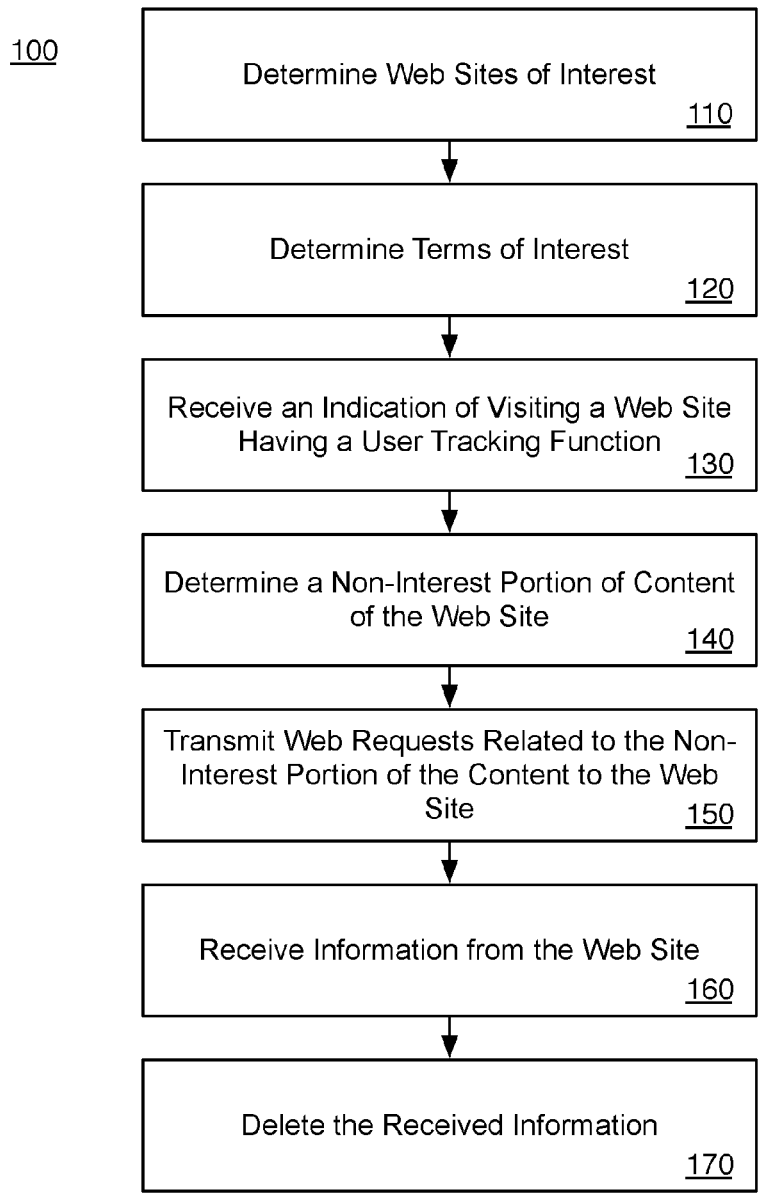
FIG. 1 is an illustration of a flow diagram of an example method for providing web tracking protection at a device.

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing web tracking protection.

In general, web tracking protection may be provided by determining web sites and terms of interest to a user and transmitting web requests related to non-interest content to a web site having a user tracking function. In general, non-interest content may include any content unrelated to the terms of interest of the user. Any information received based on the web requests may be deleted. Such techniques may provide web requests unrelated to the user's interests. Thereby, in building a profile of the user, the web site having the user tracking function may build a profile that may not accurately represent the user, and any attempts to track the user may be based on inaccurate information and may therefore be ineffective. In some examples, the web sites of interest may be determined by evaluating web browsing characteristics of a user. In some examples, the terms of interest may be determined by evaluating the terms that may be frequently found in the web sites of interest. In general, the web sites and terms of interest of a user may represent the web browsing interests of a user.

Upon visiting a web site having a user tracking function, non-interest content of the web site may be determined. In some examples, the web site may be evaluated to build a profile such as a node tree representation of the web site may be determined. Based on the interests of the user, non-interest portions of the content of the web site may be determined. In some examples, a multiple number of web requests may be generated and transmitted based on the non-interest portions of the content. As discussed, such web requests may cause the user tracking function of the web site to build an inaccurate and inefficient user profile of the user. In some examples, any information received from the web site based on the web requests may be deleted. In some examples, such web requests based on non-interest portions of the content may be made when the user is not actively browsing such that in-use bandwidth may be used for browsing by the user.

FIG. 1 is an illustration of a flow diagram of an example method 100 for providing web tracking protection at a device, arranged in accordance with at least some embodiments of the present disclosure. In general, method 100 may be performed by any suitable device, devices, or system such as those discussed herein. In some examples, method 100 may be performed by a desktop computer, a laptop computer, a mobile phone, a smartphone, a netbook device, a tablet device, a personal digital assistant, or the like. Method 100 sets forth various functional blocks or actions that may be described as processing steps, functional operations, events and/or acts, etc., which may be performed by hardware, software, and/or firmware. Numerous alternatives to the functional blocks shown in FIG. 1 may be practiced in various implementations. For example, intervening actions not shown in FIG. 1 and/or additional actions not shown in FIG. 1 may be employed and/or some of the actions shown in FIG. 1 may be eliminated, without departing from the scope of claimed subject matter. Method 100 may include one or more of functional operations as indicated by one or more of blocks 110, 120, 130, 140, 150, 160, and/or 170. The process of method 100 may begin at block 110.

At block 110, "Determine Web Sites of Interest", one or more web sites of interest to a user of a device may be determined. In general, the web sites of interest may be determined using any suitable technique or techniques. In some examples, the web sites of interest may be determined by evaluating a user parameter related to the website and determining whether the parameter may be greater than a threshold parameter.

In some examples, a web site of interest may be determined by evaluating whether a duration of visiting the web site may be greater than a threshold duration such that a web site having a duration of visiting the web site greater than the threshold duration may be a web site of interest. In some examples, a web site of interest may be determined by evaluating whether an amount of data received or retrieved from a web site may be greater than a threshold amount of data such that a web site having an amount of data received or retrieved greater than the threshold amount of data may be a web site of interest. In some examples, a web site of interest may be determined by evaluating whether a user activity during visiting a web site may be greater than a threshold user activity such that a web site having a user activity received greater than the threshold user activity may be a web site of interest. In some examples, the user activity may be a number of clicks on the web site, an amount of scrolling on the website, an amount of text entry on the web site, or the like. In some examples, the web sites of interest may be termed major web sites or major web pages. The process of method 100 may continue at block 120.

At block 120, "Determine Terms of Interest", one or more terms of interest to a user of the device may be determined. In some examples, the terms of interest may be determined based on the web sites of interest. In general, the terms of interest may be determined using any suitable technique or techniques. In some examples, the terms of interest may be determined based on an evaluation of one or more of the web sites of interest. In some examples, the evaluation may determine a multiple number of terms that may be contained in the one or more web sites of interest. In some examples, the terms of interest may be determined from the list of terms such that a term of interest may have an occurrence frequency that is greater than a threshold term frequency. In such examples, a single web site (or web page) of the web sites of interest may be used. In some examples, a subset of the web sites (or web pages) of the web sites of interest may be used. In some examples, all of the web sites (or web pages) of the web sites of interest may be used.

In some examples, the terms of interest may be determined based on evaluation of an inverse documentation frequency of the term such that the term may be a term of interest if the inverse documentation frequency may be less than a threshold term documentation frequency. In general, an inverse documentation frequency may indicate an emergence rate of a term in multiple documents such that more valuable terms may have lower inverse documentation frequencies. In such examples, a subset of the web sites (or web pages) of the web sites of interest or all of the web sites (or web pages) of interest may be used to determine a term documentation frequency. In some examples, the described term frequency and inverse documentation frequency may be used together to determine terms of interest to the user. In some examples, the described techniques may be implemented using a frequency-inverse document frequency (TF/IDF) model, or the like.

As discussed, in some examples, web sites and terms of interest to a user may be determined. In some examples, the techniques may be performed separately. In some examples, the techniques may be performed together. In some examples, the techniques may be performed periodically or substantially continuously such that the changing interests of the user may be detected and incorporated in the techniques discussed herein. Further, some devices may have multiple users and in such implementations web sites and terms of interest may be determined and maintained for each user of the device. The process of method 100 may continue at block 130.

At block 130, "Receive an Indication of Visiting a Web Site Having a User Tracking Function", the device may receive an indication that a web site having a user tracking function is being visited or was visited. In general, the indication may be received in any suitable manner and may include any suitable information. In some examples, the indication may be received upon the user device accessing or attempting to access a web site or a web page. In some examples, the indication may be received based on the web site a user may be visiting providing a cookie to the device, a modification to a cookie saved at the device, or the like. In some examples, the indication may be received based on the web site a user may be visiting providing a request for user device information.

In some examples, the indication may indicate the web site may have a user tracking function. In some examples, the indication may not indicate the web site may have the user tracking function. In some examples, the device may determine whether the web site may have a user tracking function. In some examples, the device may determine whether the web site may have a user tracking function by comparing an identifier of the web site to a list of identifiers of web sites known to have user tracking functions. In some examples, the identifier may include a uniform resource locator, or the like. In some examples of such an implementation, the device may receive the list of identifiers of web sites known to have user tracking functions from a list provider, as part of a browser application data, as part of a browser plug-in data, or the like. In some examples, the device may determine whether the web site may have a user tracking function by evaluating cookie activity related to the web site. In some examples, a web site user tracking function may be implemented by modifying one or more cookies related to the web site on the user device. In general, any techniques may be used to evaluate such activity to determine a web site may have a user tracking function. The process of method 100 may continue at block 140.

At block 140, "Determine a Non-Interest Portion of Content of the Web Site", a non-interest portion of content of the web site having the user tracking function may be determined. In general, the non-interest portion of the content may be determined using any suitable technique or techniques. In some examples, the non-interest portion of the content may be determined randomly. In some examples, content of the web site may be evaluated and compared to the terms of interest, and the non-interest portion of the content may be a portion of the content that may be unrelated to the terms of interest. In some examples, evaluating the content of the website may include forming or receiving a directory tree of the web site. In some examples, the directory tree of the web site may represent the web site directory of the web site having the user tracking function. In some examples, the directory tree of the web site may be received from a directory tree provider, as part of a browser application data, as part of a browser plug-in data, or the like. In some examples, the directory tree of the web site may be determined at the device.

As discussed, in some examples, a directory tree of the web site may be formed such that the directory tree may represent the web site directory of the web site having the user tracking function. In some examples, the non-interest portion of the content may be determined by determining a non-interest node of the directory tree. In some examples, the non-interest node may be determined by comparing the terms of interest of the user to nodes of the directory tree to determine interest nodes, and non-interest nodes may be those that may not be interest nodes. In some examples, one or more non-interest nodes may be chosen from a group of non-interest nodes. In some examples, the non-interest nodes may be chosen from the group randomly. In some examples, the non-interest nodes may be selected by evaluating the directory tree to determine the non-interest node as an equal level node of one or more of the interest nodes. In some examples, the non-interest nodes may be selected by evaluating the directory tree to determine the non-interest node as being one of a cluster of nodes of the directory that may not include one of the interest nodes. Such techniques regarding directory tree formation and non-interest node selections are discussed further herein and, in particular, with respect to FIG. 2. The process of method 100 may continue at block 150.

At block 150, "Transmit Web Requests Related to the Non-Interest Portion of the Content to the Web Site", one or more web requests related to the non-interest portion of the content of the web site may be transmitted. In some examples, the web request may be a Hypertext Transfer Protocol (http) request. In some examples, the web request may be an http GET request. In some examples, the web request may be considered an analogue request (i.e., analogous to a user request), a pseudo request, or the like. In some examples, the web requests may provide noise to the receiving web site such that actual web operations of a user may be substantially hidden. In some examples, the web requests may smooth statistics taken by the web tracking function such that statistically relevant evaluations of the user may not be made.

In general, the web request may include any suitable information and may be sent using suitable technique or techniques. In general, the web requests may be transmitted at any time and at any frequency. In some examples, the web requests may be transmitted at a random frequency. In some examples, the web requests may be transmitted at a frequency that may substantially match the activities of the user. In such implementations, actual user activities may be tracked and patterned for use in matching the transmitting of the web requests, a standard (non-customized) user profile may be used, or the like.

In some examples, the web requests may be transmitted during a time of non-web browsing activity of the device. Such techniques may provide the advantage of not competing for bandwidth that the user desires to use. In some examples, the non-web browsing activity of the device may include instances when a web browser may be open but not actively downloading, being provided user input, or the like. In some examples, the non-web browsing activity of the device may include instances when the browser may not be open (such services may be run in the background in a computing environment), instances when the device may be in standby, or the like. The process of method 100 may continue at block 160.

At block 160, "Receive Information from the Web Site", information may be received responsive to the transmitted web requests. In general, any suitable information may be received using any suitable technique or techniques. In some examples, the received information may include a web site, a document, an image file, an audio file, a video file, or the like. In some examples, the received information may be termed feedback. In general, the information my received using standard communications techniques. The process of method 100 may continue at block 170.

At block 170, "Delete the Received Information", the information received may be deleted. In general, any information received may not be of interest to the user and may be deleted. In some examples, all of the information received may be deleted. In some examples, a portion of the information may be deleted. In some examples, the information received may be maintained and evaluated by the user for deletion.

As will be appreciated, the process of blocks 130, 140, 150, 160, 170 of method 100 may be repeated or operated in parallel for any number of web sites. As discussed, in some examples, the web site having the user tracking function may be a web site the user may have visited. In some examples, the website having the user tracking function may be a web site that may be providing information to or requesting information from a web site the user may have visited. In general, the techniques discussed herein may be implemented as web tracking protection in such situations.

As discussed herein and, in particular with respect to block 110 of FIG. 1, web sites of interest for a user may be determined. In some examples, the web site of interest may be determined to be a web site of interest by evaluating a user parameter related to the website and determining whether the parameter may be greater than a threshold parameter. In some examples, a web site of interest may be determined by evaluating whether a duration of visiting the web site may be greater than a threshold duration such that a web site having a duration of visiting the web site greater than the threshold duration may be a web site of interest. As an example of such techniques, a duration of time visiting a web site, p, may be defined as $T^p$ and the threshold time may be defined as $T_{threshold}$. In such examples, a web site may be a web site of interest if it satisfies equation 1 below.

$$T^p \geq T_{threshold} \qquad (1)$$

As discussed herein and, in particular, with respect to block 120 of FIG. 1, terms of interest may be determined based on the web site or web sites of interest. In some examples, the terms of interest may be determined based on a term frequency of the term, an inverse documentation frequency of the term, or a combination thereof. As an example of such techniques, a degree of importance, $w_{ij}$, of term in a web site or multiple web sites may determined as:

$$w_{ij} = tf_{ij} \times idf_i = tf_{ij} \times \log\left(\frac{N}{n}\right) \qquad (2)$$

where t may be a term, N may be the test number of a corpus (a positive integer), the corpus may be composed of the web pages of interest for the user, n may be the number of texts which t occurs in, positive integers, $idf_j$ may be a term frequency, $idf_j$ may be a term inverse document frequency (which may be attained by advanced training on a standard corpus), and i and j may be counter variables. In some examples, equation (2) may provide more importance than may be suitable for certain terms such as, for example, title terms, topic terms, terms labeling charts, and the like. In such examples, equation (3) may provide a more accurate degree of importance for a term:

$$w_{ij} = tf_{ij} \times \log\left(\frac{N}{n}\right) \times (1 + \alpha) \qquad (3)$$

where α may be a place gene chosen such that $0.5 \geq \alpha \geq 0$. In some examples, the described techniques may be implemented using frequency-inverse document frequency (TF/IDF) model, or the like.

As discussed herein and, in particular, with respect to block 140 of FIG. 1, a non-interest portion of content of the web site having the user tracking function may be determined. In some examples, content of the web site may be evaluated and compared to the terms of interest, and the non-interest portion of the content may be a portion of the content that may be unrelated to the terms of interest. As discussed, in some examples, evaluating the content of the website may include forming or receiving a directory tree of the web site such that the directory tree of the web site may represent the web site directory of the web site having the user tracking function.

Figure 2:
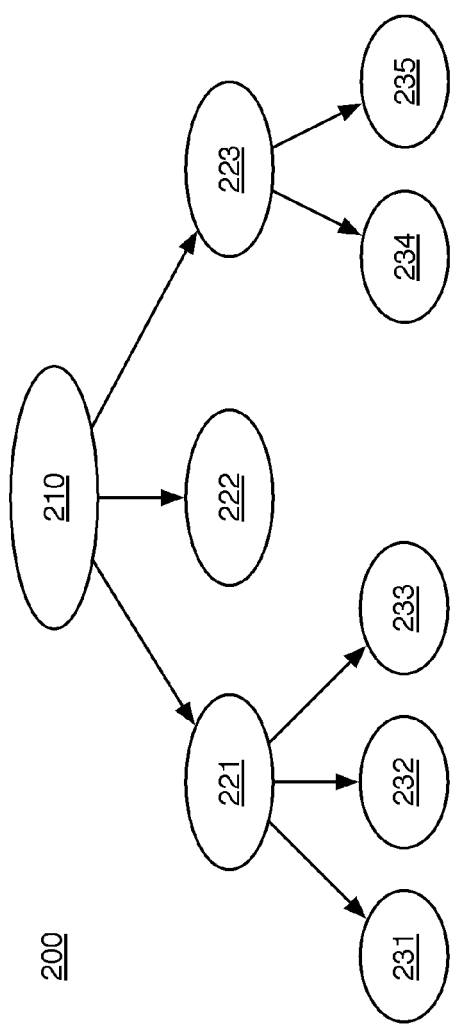
FIG. 2 is an illustration of a block diagram of an example directory tree representing a web site.

FIG. 2 is an illustration of a block diagram of an example directory tree 200 representing a web site, arranged in accordance with at least some embodiments of the present disclosure. As shown, directory tree 200 may include level 1 (or root) node 210, level 2 nodes 221, 222, 223, and level 3 nodes 231, 232, 233, 234, 235. In general, directory tree 200 may offer a simplified example of a web site directory tree. In general, directory tree 200 may include any number of nodes, such as any number of level 1 nodes, any number of level 2 nodes, any number of level 3 nodes, or the like. Although directory tree 200 may be shown with three node levels, in general, directory tree may include any number of node levels. In some examples, all of the web pages in the web site which have a user tracking function may be mapped onto the node according to their directory. In some examples, every node of directory tree 200 may represent a web page set.

In general, directory tree 200 may be formed in any suitable manner. In some examples, directory tree 200 may be formed by detecting a structure of a web site. In general, the structure of a web site may be determined using any suitable technique or techniques. In some examples, the structure of a web site may be determined using a software function. In some examples, the structure of a web site may be determined by implementing a traversal path using a function such as System.IO.Directory.GetDirectories(stringpath). In some examples, the structure of a web site may be determined using a loop calling a function such as the described software functions.

In some examples, directory tree 200 may be formed by providing and labeling nodes based on the determined web site structure. In some examples, providing and labeling nodes may include cataloguing the web site and extracting terms to represent content at nodes in directory tree 200. As an example of such techniques, assume a node, $N_d$. For the node, a random number of web sites or pages of the node may be randomly chosen. For this example, five web pages, $p_i$, $p_{i+1}$, $p_{i+2}$, $p_{i+3}$, $p_{i+4}$, may be chosen. Using the five web pages as a corpus, a number of topic terms may be extracted from the five web pages to represent a multiple number of topics which may belong to the node. In some examples, the topic terms may be extracted using equation (3), as discussed above. In the example of directory tree 200, three topic terms may be extracted. Each topic term may be provided to level 2 nodes 221, 222, 223. As a specific example, root node 210 may represent the term "sport" and the extracted topic terms may include "basketball" (node 221), "rugby" (node 222), and "soccer" (node 223). In some examples, a node may include one term. In some examples, a node may include more than one term.

In some examples, the discussed extraction techniques may be repeated to create level 3 nodes 231, 232, 233, 234, 235 and to generally construct directory tree 200. Continuing the above example, level 3 nodes 231, 232, 233 may represent particular basketball teams ("The Lakers"), particular basketball players ("Kobe Bryant"), or the like, level 3 node 234 may similarly represent particular soccer teams, countries, or players, or the like. As shown level 2 node 222 may not be attached to any level 3 nodes such that no significant terms relating to level 2 node 222 ("rugby") may have been determined.

As discussed herein, in some examples, the formation of directory tree 200 may be performed at the device. In some examples, the device may perform the calculations necessary to form directory tree 200 during non-use by the user of the device. As discussed herein, in some examples, the formation of directory tree 200 may be performed at a server system or software provider system and directory tree 200 may be provide to the device. In some examples, directory tree 200 may be provided as a data structure in a computer readable data structure implementing a web browser, a web plug-in, or the like. Such implementations may offer advantages of scale (such that a web sites directory tree may only be formed once) and specialization.

In some examples, the non-interest portion of a web site may be determined by comparing the terms of interest of the user to the terms represented by the nodes of directory tree 200. In some examples, terms of interest of the user may be mapped to the nodes of directory tree 200. In some examples, similarities between the terms of interest and the nodes of directory tree 200 may be determined using the following:

$$S(Its, N_d) = \frac{1}{N} \times \sum_{i=1}^{N} \max_{j=1}^{M} \left[ sim(t_i^{Its}, t_j^{N_d}) \right] \quad (4)$$

where S may be the similarity between a term of interest, Its, and a node $N_d$, Its may be the set of term of interest for user, $N_d$ may be the set of topic terms of a node in directory tree 200, sim may be a term similarity algorithm, t may be a term, N may be a number of nodes, M may be a number of terms of interest, and i and j may be counter variables. In some examples, the user's interest may thereby be mapped to a user interest node (or nodes), which has (or may have) the biggest S, represented as: $N^{con}$.

In some examples, the non-interest nodes may be chosen such that they do not include any of the nodes of interest of the user. In some examples, the non-interest nodes may be chosen randomly from the group of nodes not including the node or nodes of interest to the user. In some examples, the non-interest node may be an equal level node of an interest node, $N^{con}$. For example, if $N^{con}$ is level 2 node 221, an equal level node may be level 2 node 222 or level 2 node 223. In some examples, the non-interest node may be chosen among equal level nodes randomly. Such techniques may offer the advantage of ease of implementation, low processing requirements, and/or speed but may not offer accurate non-interest nodes.

In some examples, the non-interest node may be chosen based on a clustering result. In some examples, a clustering algorithm such as an expectation-maximization (EM) algorithm, a k-means (centroid model) algorithm, a simulated neural network (SNN) algorithm, or the like may be used to cluster nodes of directory tree 200. In such examples, clusters that do not include a node of interest (i.e., $N^{con}$) may be taken as a candidate for non-interest of the user. In some examples, non-interest nodes may be chosen from such clusters randomly. Such techniques may offer the advantage of highly accurate non-interest nodes but may take substantial processing power and/or time.

As discussed herein, web requests related to non-interest content of a web page may be generated and transmitted. In general, any number or amount of web requests may be generated and transmitted. Fewer web requests may provide simplicity and/or low bandwidth requirements but may not ensure alteration of the efficiency of a web tracking function. More web requests may provide significant smoothing of the user's web browsing such that the web tracking protection may be highly effective but may provide complexity and/or high bandwidth usage. In some examples, the number of web requests may be optimized. For example, for a node, $N_d$, the volume, V, of web requests may be determined by the following:

$$V_{N_d} = V_{N^{con}} \times \frac{\beta}{\sum_i \sum_j sim(t_i^{N^{con}} \cdot t_j^{N_d})} \quad (5)$$

where $V_{N^{con}}$ may be the volume of the user's actual web requests, $\beta$ may be an adjust coefficient and may be chosen such that $1 \geq \beta \geq 0$, and sim may be a term similarity algorithm to determine a similarity between nodes.

FIG. 3 illustrates an example computer program product 300, arranged in accordance with at least some embodiments of the present disclosure. Computer program product 300 may include machine readable non-transitory medium having stored therein a plurality of instructions that, when executed, cause the machine to provide web tracking protection according to the processes and methods discussed herein. Computer program product 300 may include a signal bearing medium 302. Signal bearing medium 302 may include one or more machine-readable instructions 304, which, when executed by one or more processors, may operatively enable a computing device to provide the functionality described herein. In some examples, machine-readable instructions 304 may be provided as web browser software. In some examples, machine-readable instructions 304 may be provided as a web browser plug-in. In various examples, some or all of the machine-readable instructions may be used by the devices discussed herein.

In some implementations, signal bearing medium 302 may encompass a computer-readable medium 306, such as, but not limited to, a hard disk drive, a Compact Disc (CD), a Digital Versatile Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communication link, a wireless communication link, etc.). In some examples, signal bearing medium 302 may encompass a machine readable non-transitory medium.

Figure 4:
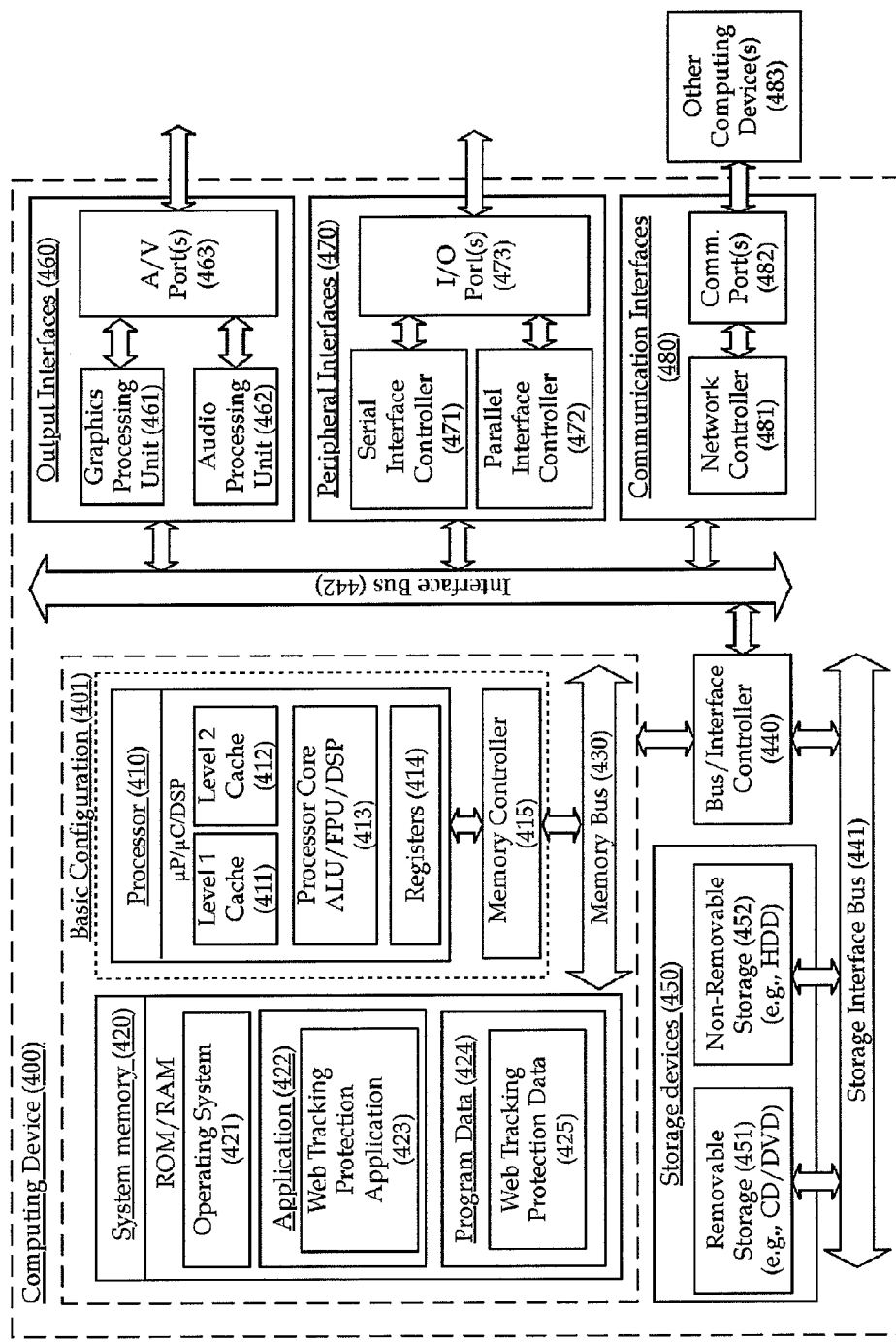
FIG. 4 is an illustration of a block diagram of an example computing device, all arranged in accordance with at least some embodiments of the present disclosure.

FIG. 4 is a block diagram illustrating an example computing device 400, arranged in accordance with at least some embodiments of the present disclosure. In various examples, computing device 400 may be configured to provide web tracking protection as discussed herein. In various examples, computing device 400 may be configured to provide web tracking protection at a device as discussed herein. In one example basic configuration 401, computing device 400 may include one or more processors 410 and system memory 420. A memory bus 430 can be used for communicating between the processor 410 and the system memory 420.

Depending on the desired configuration, processor 410 may be of any type including but not limited to a microprocessor (μP), a microcontroller (μC), a digital signal processor (DSP), or any combination thereof. Processor 410 can include one or more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the processor 410, or in some implementations the memory controller 415 can be an internal part of the processor 410.

Depending on the desired configuration, the system memory 420 may be of any type including but not limited to volatile memory (such as RAM), non-volatile memory (such as ROM, flash memory, etc.) or any combination thereof. System memory 420 may include an operating system 421, one or more applications 422, and program data 424. Application 422 may include web tracking protection application 423 that can be arranged to perform the functions, actions, and/or operations as described herein including the functional blocks, actions, and/or operations described herein. Program Data 424 may include web tracking protection data 425 for use with web tracking protection application 423. In some example embodiments, application 422 may be arranged to operate with program data 424 on an operating system 421. This described basic configuration is illustrated in FIG. 4 by those components within dashed line 401.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more NV ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 483 over a network communication via one or more communication ports 482. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 400 may also be implemented as a personal computer including both laptop computer and non-laptop computer configurations. In addition, computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for providing web tracking protection at a device comprising:
   determining one or more web sites of interest to a user of the device;
   determining one or more terms of interest to the user based at least in part on the one or more web sites of interest;
   receiving an indication of visiting a web site having a user tracking function;

determining a non-interest portion of content of the web site having the user tracking function, the non-interest portion of the content being unrelated to the one or more terms of interest;

transmitting one or more web requests to the web site having the user tracking function, the one or more web requests being related to the non-interest portion of the content of the web site;

responsive to the one or more web requests, receiving information from the web site having the user tracking function; and deleting at least a portion of the information received from the web site having the user tracking function.

2. The method of claim 1, wherein determining the one or more web sites of interest to the user of the device comprises at least one of determining a duration of visiting a first web site of the one or more web sites of interest is greater than a threshold duration, determining an amount of data received from the first web site of the one or more web sites of interest is greater than a threshold amount of data, or determining a user activity during visiting the first web site of the one or more web sites of interest is greater than a threshold user activity.

3. The method of claim 1, wherein determining the one or more terms of interest to the user based at least in part on the one or more web sites of interest comprises at least one of determining a term frequency of a first term of the one or more terms in a first web site of the one or more web sites of interest is greater than a threshold term frequency.

4. The method of claim 1, further comprising:
determining the web site having the user tracking function has the user tracking function by comparing an identifier of the web site to a list of identifiers of web sites known to have user tracking functions.

5. The method of claim 4, further comprising:
receiving the list of identifiers of web sites known to have user tracking functions.

6. The method of claim 1, further comprising:
determining the web site having the user tracking function has the user tracking function by evaluating cookie activity related to the web site.

7. The method of claim 1, wherein transmitting the one or more web requests comprises transmitting the one or more web requests during a time of non-web browsing activity of the device.

8. The method of claim 1, wherein transmitting the one or more web requests comprises transmitting the one or more web requests at a random frequency.

9. The method of claim 1, wherein the information received from the web site having the user tracking function comprises at least one of a web site, a document, an image file, an audio file, or a video file.

10. The method of claim 1, wherein determining the non-interest portion of content of the web site having the user tracking function comprises determining a non-interest node of a directory tree representing a web site directory of the web site having the user tracking function.

11. The method of claim 10, further comprising:
receiving the directory tree representing the web site directory of the web site having the user tracking function.

12. The method of claim 10, further comprising:
determining the directory tree representing the web site directory of the web site having the user tracking function.

13. The method of claim 10, wherein determining the non-interest node of the directory tree comprises mapping a first term of the one or more terms of interest to a first node in the directory tree and selecting the non-interest node from the directory tree such that the non-interest node and the first node are equal level nodes.

14. The method of claim 10, wherein determining the non-interest node of the directory tree comprises mapping the one or more terms of interest in the directory tree to one or more nodes of the directory tree and selecting the non-interest node from a cluster of nodes of the directory tree such that the cluster of nodes does not include any of the one or more nodes related to the one or more terms of interest.

15. The method of claim 1, wherein the device comprises at least one of a desktop computer, a laptop computer, a mobile phone, a smartphone, a netbook device, a tablet device, or a personal digital assistant.

16. A machine readable non-transitory medium having stored therein instructions that, when executed, cause a device to provide web tracking protection by:
determining one or more web sites of interest to a user of the device;
determining one or more terms of interest to the user based at least in part on the one or more web sites of interest;
receiving an indication of visiting a web site having a user tracking function;
determining a non-interest portion of content of the web site having the user tracking function, the non-interest portion of the content being unrelated to the one or more terms of interest;
transmitting one or more web requests to the web site having the user tracking function, the one or more web requests being related to the non-interest portion of the content of the web site;
responsive to the one or more web requests, receiving information from the web site having the user tracking function; and
deleting at least a portion of the information received from the web site having the user tracking function.

17. The machine readable non-transitory medium of claim 16, wherein the instructions comprise a web browser plug in.

18. A device comprising:
a machine readable medium having stored therein instructions that, when executed, cause the device to provide web tracking protection by:
determining one or more web sites of interest to a user of the device;
determining one or more terms of interest to the user based at least in part on the one or more web sites of interest;
receiving an indication of visiting a web site having a user tracking function;
determining a non-interest portion of content of the web site having the user tracking function, the non-interest portion of the content being unrelated to the one or more terms of interest;
transmitting one or more web requests to the web site having the user tracking function, the one or more web requests being related to the non-interest portion of the content of the web site;
responsive to the one or more web requests, receiving information from the web site having the user tracking function; and
deleting at least a portion of the information received from the web site having the user tracking function; and
a processor coupled to the machine readable medium to execute the instructions.

19. The device of claim 18, wherein determining the one or more terms of interest to the user based at least in part on the one or more web sites of interest comprises at least one of determining a term frequency of a first term of the one or more terms in a first web site of the one or more web sites of interest is greater than a threshold term frequency or determining an inverse term frequency of the first term of the one or more terms in a plurality of the one or more web sites of interest is less than a threshold inverse term frequency.

20. The device of claim 18,
wherein determining the non-interest portion of the content of the web site having the user tracking function comprises determining a non-interest node of a directory tree representing a web site directory of the web site having the user tracking function, and
wherein determining the non-interest node of the directory tree comprises at least one of mapping a first term of the one or more terms of interest to a first node in the directory tree and selecting the non-interest node from the directory tree such that the non-interest node and the first node are equal level nodes or mapping the one or more terms of interest in the directory tree to one or more nodes of the directory tree and selecting the non-interest node from a cluster of nodes of the directory tree such that the cluster of nodes does not include any of the one or more nodes related to the one or more terms of interest.

21. The device of claim 18, wherein the instructions comprise a web browser plug in.

* * * * *